US006576897B1

(12) United States Patent
Steiner et al.

(10) Patent No.: US 6,576,897 B1
(45) Date of Patent: Jun. 10, 2003

(54) LENS-FREE ION COLLISION CELL

(75) Inventors: Urs Steiner, Sunnyvale, CA (US); Hansjorg J. Cueni, Zwingen (CH)

(73) Assignee: Varian, Inc., Palo Alto, CA (US)

( * ) Notice: Subject to any disclaimer, the term of this patent is extended or adjusted under 35 U.S.C. 154(b) by 288 days.

(21) Appl. No.: 09/661,162

(22) Filed: Sep. 13, 2000

(51) Int. Cl.[7] .......................... B01D 59/44; H01J 49/00

(52) U.S. Cl. ...................................... 250/292; 250/281

(58) Field of Search ................................ 250/292, 281

(56) References Cited

U.S. PATENT DOCUMENTS

| | | | | |
|---|---|---|---|---|
| 4,329,582 A | * | 5/1982 | French et al. | 250/281 |
| 5,576,540 A | * | 11/1996 | Jolliffe | 250/282 |
| 5,767,513 A | * | 6/1998 | Dressler et al. | 250/290 |
| 6,011,259 A | * | 1/2000 | Whitehouse et al. | 250/287 |
| 6,222,185 B1 | * | 4/2001 | Speakman et al. | 250/288 |
| 6,417,511 B1 | * | 7/2002 | Russ et al. | 250/292 |

* cited by examiner

*Primary Examiner*—Bruce Anderson
(74) *Attorney, Agent, or Firm*—Bella Fishman

(57) ABSTRACT

An ion collision cell for use in a mass spectrometer uses pre-collision and post-collision evacuation regions with a sealed collision region therebetween without the need for lens to separate the regions. A continuous rod design reduces mechanical cost and simplifies the electronic design. A longer collision cell allows lower pressure operation, and a curved configuration permits the exit of neutral particles. A square quadrapole cross-section allows a field free region in the center of the cell and minimizes ion node effects. In one embodiment, the ion collision cell includes first and second pole segments mounted on a first support plate with the pole segments having pole surfaces arranged at approximately 90° with respect to each other, and third and fourth pole segments mounted on a second support plate, the pole segments having pole surfaces arranged at approximately 90° with respect to each other. The first support plate and the second support plate are assembled together with a spacer for placing the first, second, third, and fourth pole segments in juxtaposition with the pole surfaces arranged in a generally square cross section. A sealant is provided for vacuum sealing an intermediate length of the assembled pole segments with a gas inlet in the intermediate length for introducing a gas into the assembled pole segments and with evacuation ports at opposing ends of the assembled pole

28 Claims, 10 Drawing Sheets

EXPLOSION VIEW OF THE COLLISION CELL

QUADRUPOLE MS/MS

PLAN VIEW OF COLLISION CELL

PERSPECTIVE VIEW OF THE COLLISION CELL

EXPLOSION VIEW OF THE COLLISION CELL

LOWER HALF OF THE
COLLISION CELL

SECTION VIEW OF HIGHER PRESSURE PORTION

SECTION VIEW OF END OF
LOWER PRESSURE PORTION

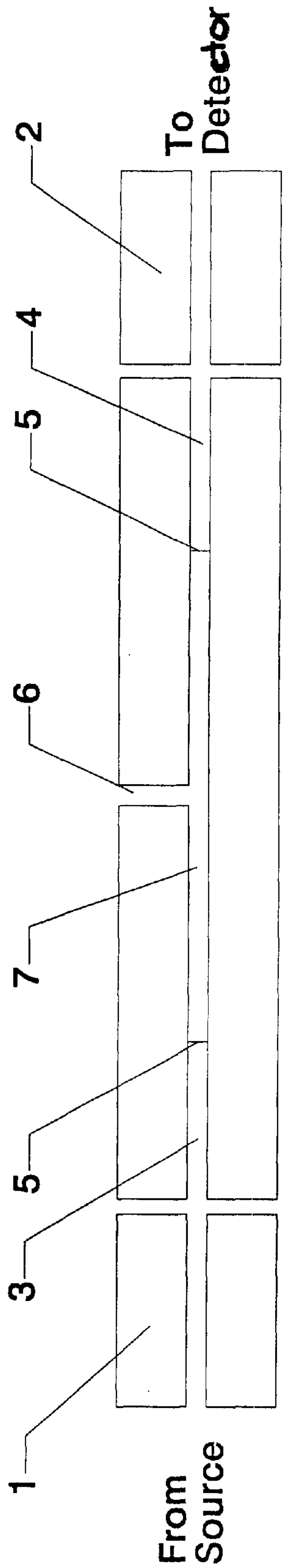
FIG 10-A
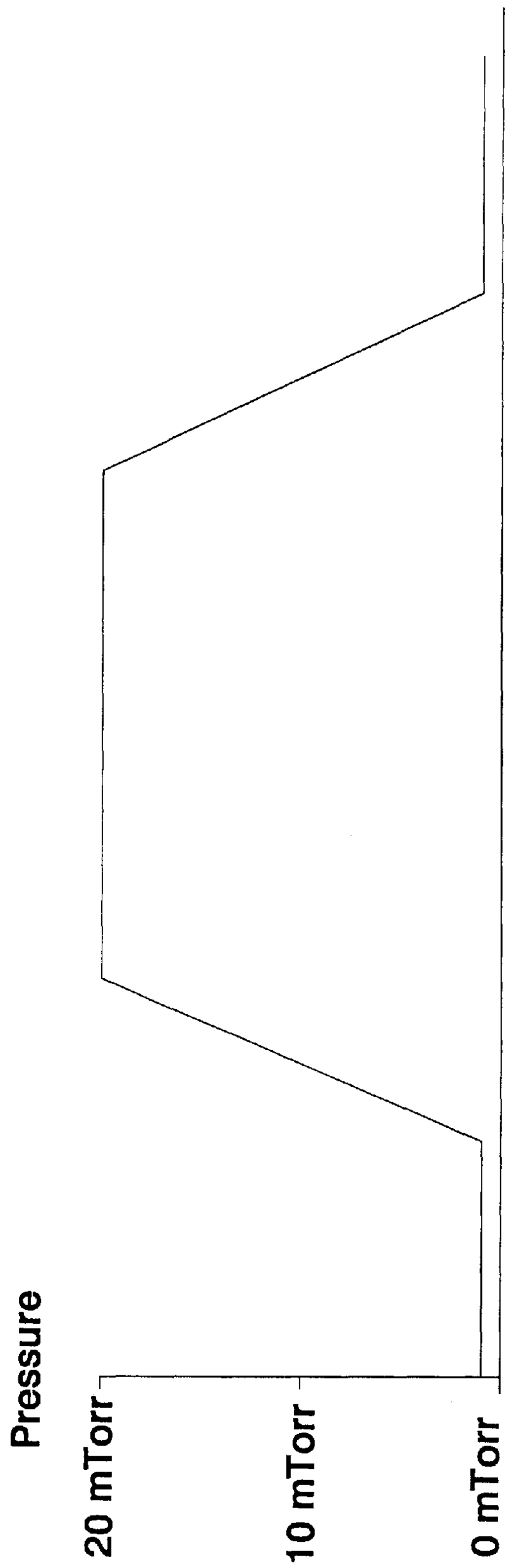
FIG 10-B
PRESSURE PROFILE

LENS-FREE ION COLLISION CELL

BACKGROUND OF THE INVENTION

This invention relates generally to mass spectrometers and to collision cells used therein, and more particularly the invention relates to a lens-free ion collision cell.

Mass spectrometers are well known scientific instruments for analyzing chemical structures. A mass spectrometer includes an ion source, an ion filter, and an ion detector. Analyte is introduced into the ion source which ionizes the material. Ions are then selected by the ion filter and passed to the ion detector. The ion filter selects ions having a particular m/e ration which may be varied to analyze the gas. Examples of mass spectrometers are described in U.S. Pat. Nos. 5,559,327; 5,389,785; 5,298,745; 4,949,047; 4,885,470; 4,158,771; and 3,757,115.

These and other known mass spectrometers employ filters having linear hyperbolic quadrapoles. FIG. 1 is a schematic perspective view of the ion filters described in U.S. Pat. No. 5,389,785 to Urs Steiner et al. The filter includes four linear rod electrodes 3, each rod electrode having a hyperbolic curved pole surface 5 and two abutment surfaces 7 so that the rods can be assembled with opposing pairs of hyperbolic surfaces. Rods with opposing hyperbolic surfaces are electrically connected, and both RF and DC voltages are impressed on the rods with the RF voltages on adjacent poles being out of phase and the DC voltages on adjacent poles being offset.

FIG. 2 is a plan view of a mass spectrophotometer employing hyperbolic quadrapoles as disclosed in U.S. Pat. No. 5,559,327. The mass spectrometer is mounted in a housing 10 with a prefilter 12, a primary mass filter 14, a collision cell 16, and a secondary mass filter 18 in serial alignment between an ion source 20 and an ion detection system 22. Bolts 13 and posts 15 are provided for mounting quadrapole segments. Ion source 20 and ion detector system 22 are provided at opposing ends of the filter and collision detector assembly. An ultra high vacuum pump 24 is centrally disposed in the housing to maintain a vacuum in a quadrapole element. Prefilter 12 is positioned in a first sealed region of the housing provided by the wall 30 and O-ring 32 which engages a cover (not shown) to provide the vacuum seal for a source pressure vacuum chambers. An ion lens 34 permits ions to pass from prefilter 12 to the primary mass filter 14 in a second sealed chamber of the housing provided by wall 36 and an o-ring 38 which mates with the cover (not shown) whereby a pressure on the order of $10^{-6}$–$10^{-7}$ Torr can be maintained for an analyzer pressure vacuum chamber. Ion lens 40 is provided between the primary mass filter 14 and the collision cell 16, ion lens 42 is provided between collision cell 16 and secondary mass filter 18, and ion lens 44 is provided between secondary mass filter 18 and detector 22.

The function of a collision cell is to modify ions by either colliding them into fragments, or to react them with other molecules. In both cases, a parent ion is introduced into a higher-pressure region for a given time. The resulting fragment or product daughter ions are then exiting the cell. The collision or reaction energy can be varied by the parent ion's initial velocity, the size of the collision gas, and the number of collisions encountered. The number of collisions is depended on the gas pressure and the reaction time. During the collision process, the charge of the parent ion will hang on to one fragment part, where as the remaining part will be neutral. These neutrals can pass through the next mass filter, and produce non-specific signals, reducing the sensitivity of the mass spectrometer. If a Parent ion hits a collision gas molecule, its flight path will be altered. For this reason most cell designs are built around multi-pole structures containing an ion focusing RF field.

A collision detector in accordance with this invention combines all these functions, while maintaining a continuous focusing of the ions throughout.

SUMMARY OF THE INVENTION

In accordance with the invention, an ion collision cell is provided which is lens-free by providing a high pressure collision region with pre- and post-evacuation sections. A continuous quadrature rod design reduces mechanical cost and simplifies electronic design. Ion node effects are minimized by eliminating small aperture ion lenses, and collision cell length permits lower pressure operation. By placing a curve in the collision region all neutrals (uncharged ions and ion fragments) will not be focused by the RF fields and will travel in straight lines and exiting the collision region of the cell. A square quadrapole, cross section allows a field free region in the center of the quadrapoles which minimizes node effects and allows a broad stable mass range for a given RF amplitude. An appropriate gap can be selected between adjacent rods to optimize the evacuation sections yet maintain ion stability. By adding a DC voltage to all rods, the parent ion entrance velocity can be easily adjusted over a wide range of energies.

In accordance with one embodiment of the invention, the lens-free ion collision cell comprises first and second pole segments mounted on a first support plate with the pole segments having pole surfaces arranged at approximately 90° with respect to each other. Third and fourth pole pieces are mounted on a second support plate with the second pole segments having pole surfaces arranged at approximately 90° with respect to each other. The first support plate and the second support plate are assembled together with a spacer for placing the first, second, third and fourth pole segments in juxtaposition with the pole surfaces arranged in a generally square cross section. A sealant is provided for vacuum sealing an intermediate length of the assembled pole segments, and a gas inlet is provided in the intermediate length for introducing a gas into the assembled pole segments. Evacuation ports are provided at opposing ends of the assembled pole segments.

The assembled pole segments can be linear in configuration or curved, such as 90° or 180°. In operation the collision cell combines the functions of ion lenses or RF multipoles while allowing the gas from the collision cell to be pumped away and while maintaining a continuous focusing of the ions throughout the collision cell The invention and objects and features thereof will be more readily apparent from the following detailed description and appended claims when taken with the drawings.

BRIEF DESCRIPTION OF THE DRAWINGS

FIG. 10A illustrates a longitudinal cross section of the collision cell, and FIG. 10B illustrates the pressure in zones of the collision cell.

DETAILED DESCRIPTION OF ILLUSTRATIVE EMBODIMENTS

Figure 1:
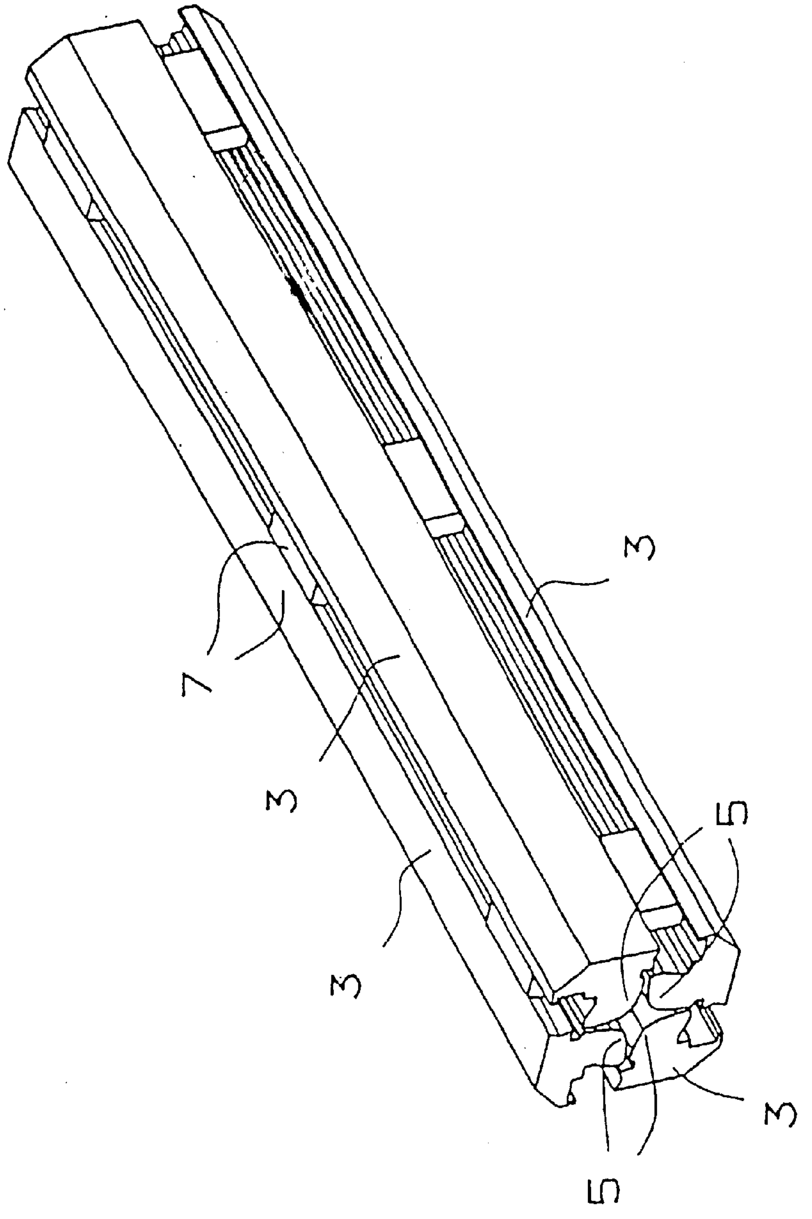
FIG. 1 PRIOR ART
FIG. 1 is a perspective view of an ion filter in accordance with the prior art.
Figure 2:
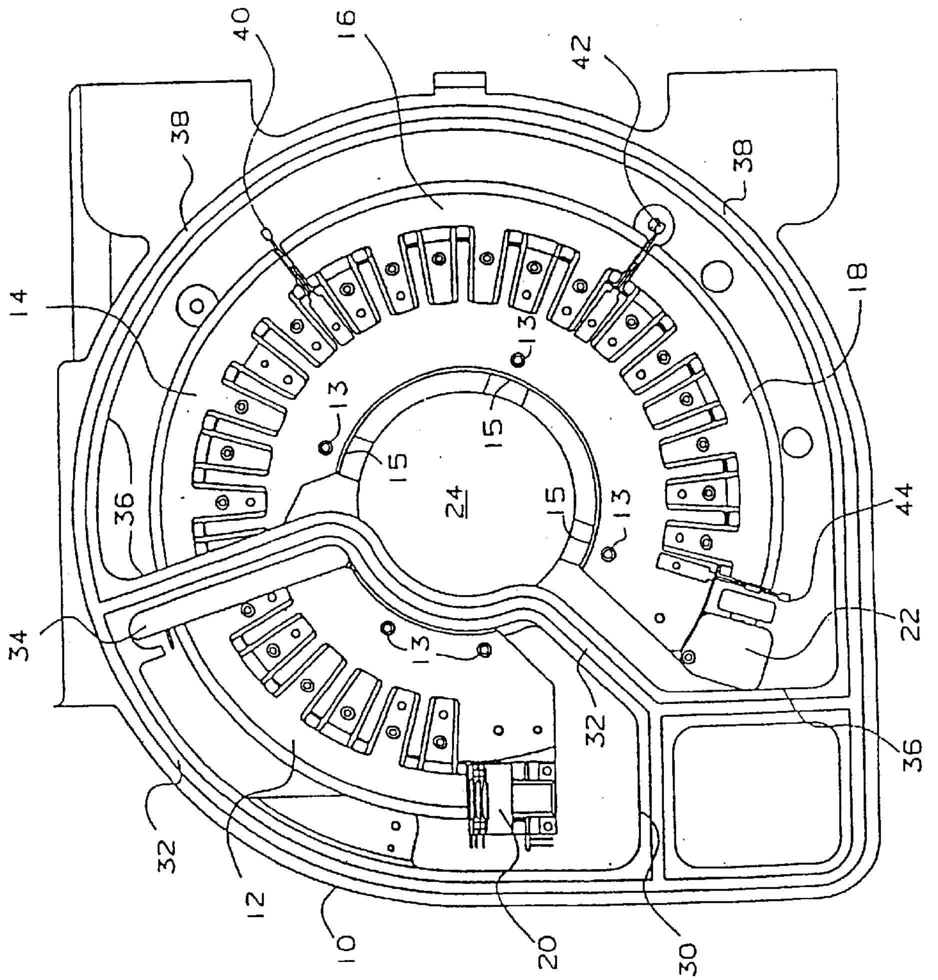
FIG. 2 PRIOR ART
FIG. 2 is a plan view of a mass spectrometer using a quadrapole ion filter accordance with the prior art.
Figure 3:
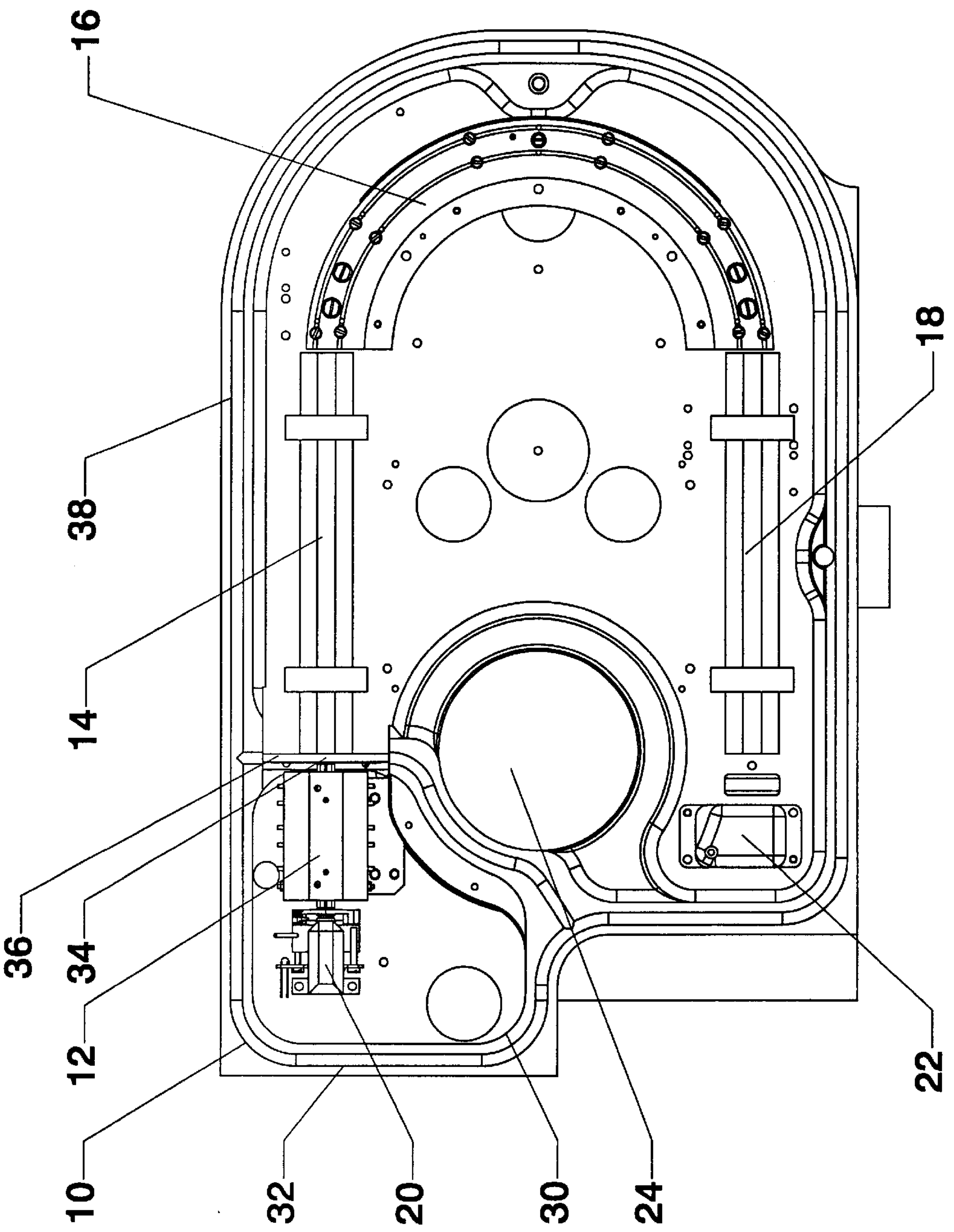
FIG. 3 is a plan view of a quadrapole mass spectrometer including a collision cell in accordance with an embodiment of the invention.

FIG. 3 is a plan view of a quadrapole mass spectrometer including a collision cell in accordance with an embodiment of the invention. The mass spectrometer is now commercially available as 1200 MS mass spectrometer from Varian, Inc., Assignee hereof. The device has functional elements corresponding to the functional elements of the prior art mass spectrometer shown in FIG. 2. The mass spectrometer is mounted in a housing 10 with a prefilter 12, a primary mass filter 14, a collision cell 16, and a secondary mass filter 18 in serial alignment between an ion source 20 and an ion detection system 22. Ion source 20 and ion detector system 22 are provided at opposing ends of the filter and collision detector assembly. An ultra high vacuum pump 24 is centrally disposed in the housing to maintain a vacuum in a quadrapole elements. Prefilter 12 is positioned in a first sealed region of the housing provided by the wall 30 and O-ring 32 which engages a cover (not shown) to provide the vacuum seal for a source pressure vacuum chamber. However, an ion lens is not required with collision cell 16.

Figure 4:
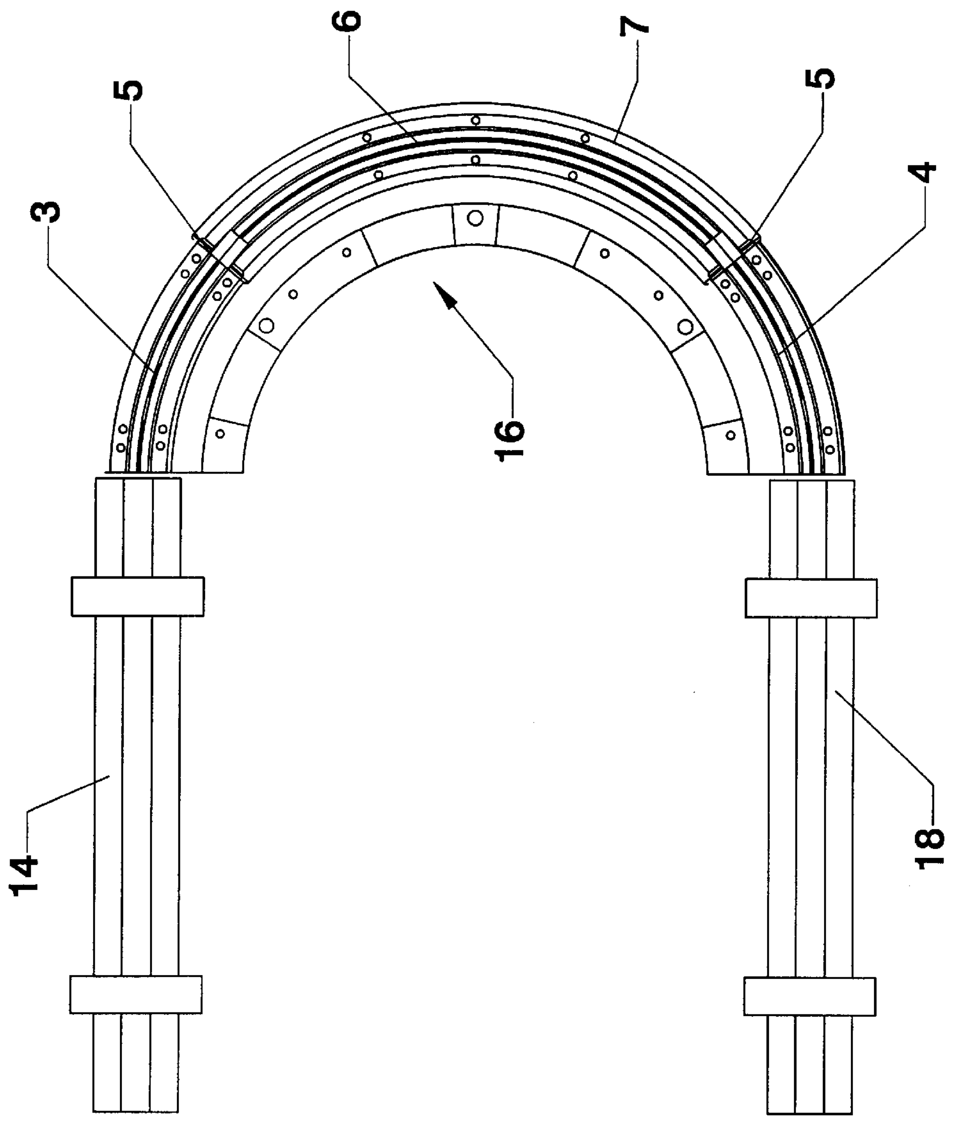
FIG. 4 is a plan view of the collision cell in FIG. 3.

FIG. 4 is a plan view of the collision cell 16 in FIG. 3. The cell includes a pre-collision low pressure zone 3 and a post-collision low pressure zone 4 with the higher pressure collision region 6 therebetween. Gas seal apertures 5 are provided at either end of the collision region, all as will be described in more detail with reference to FIGS. 5–9.

Figure 5:
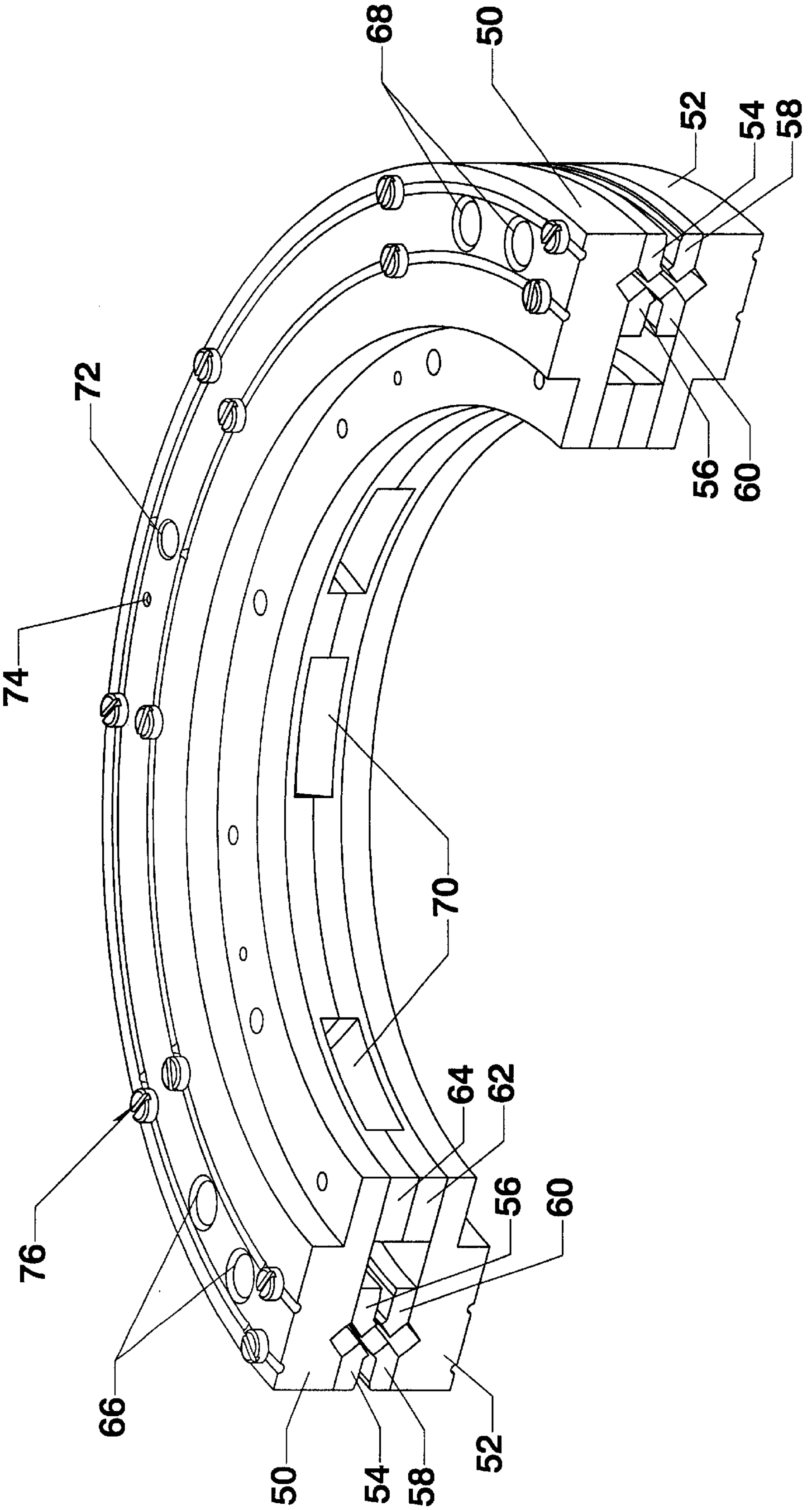
FIG. 5 is a perspective view of the collision cell of FIG. 4.
Figure 6:
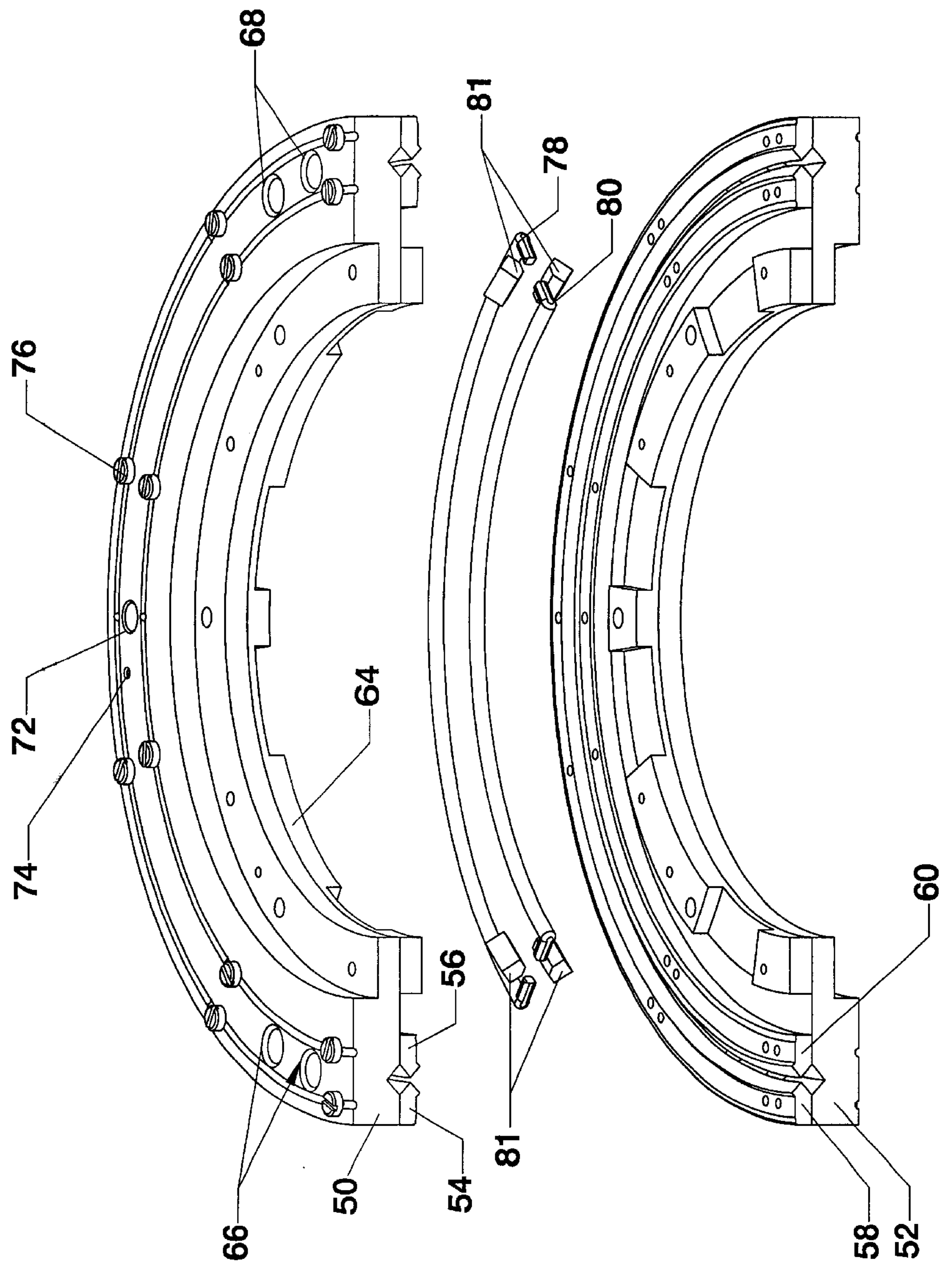
FIG. 6 is an exploded perspective view of the collision cell of FIG. 5.
Figure 7:
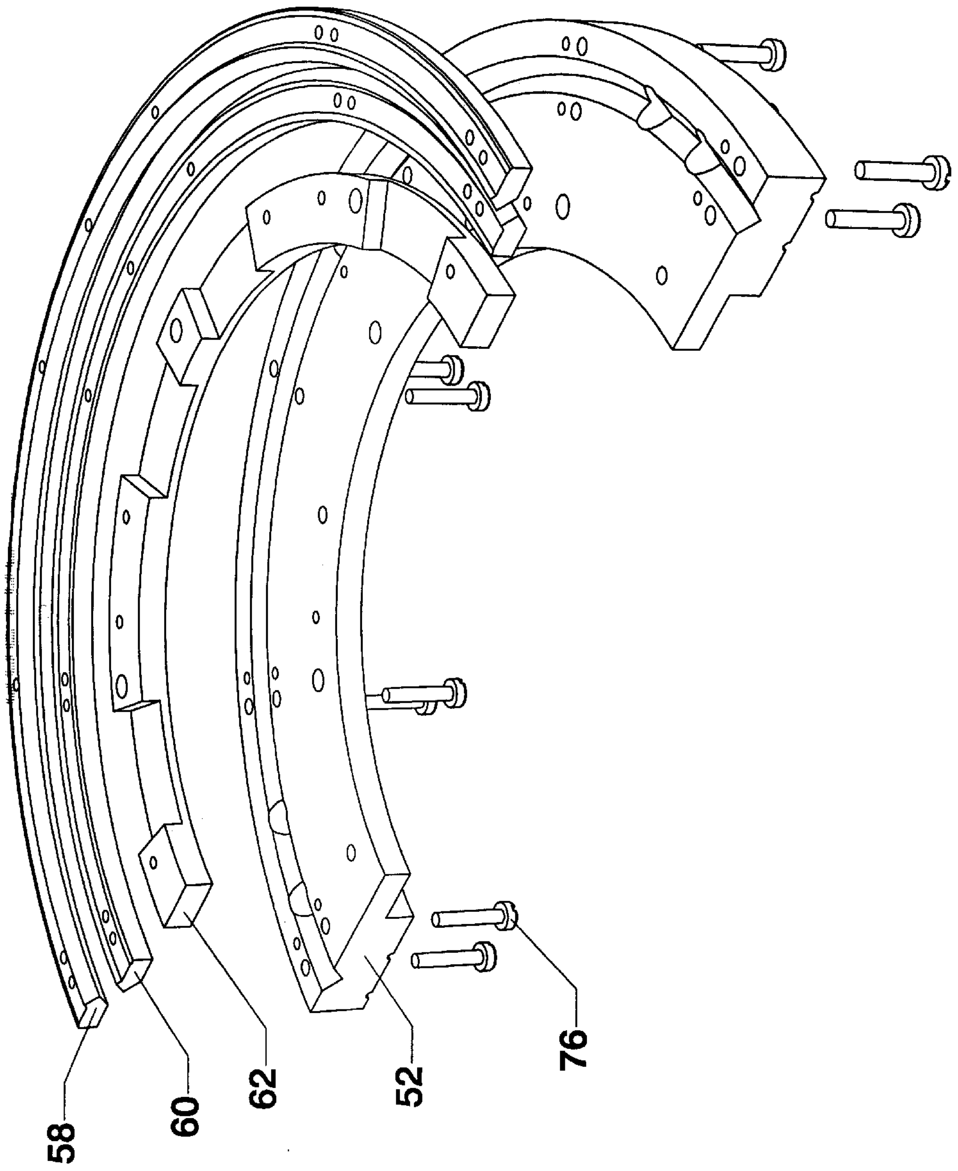
FIG. 7 is an exploded perspective view of the lower half assembly of the collision cell of FIG. 6.
Figure 8:
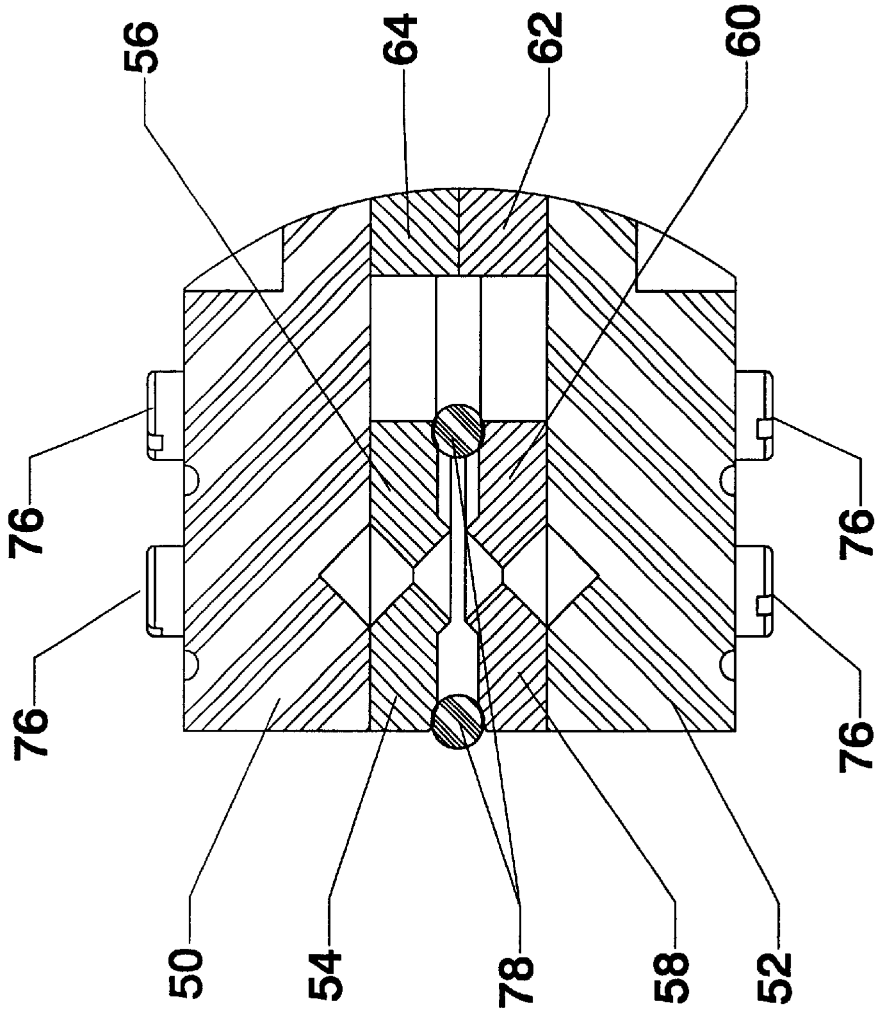
FIG. 8 is a section view across the higher pressure central portion of the collision cell of FIG. 5.
Figure 9:
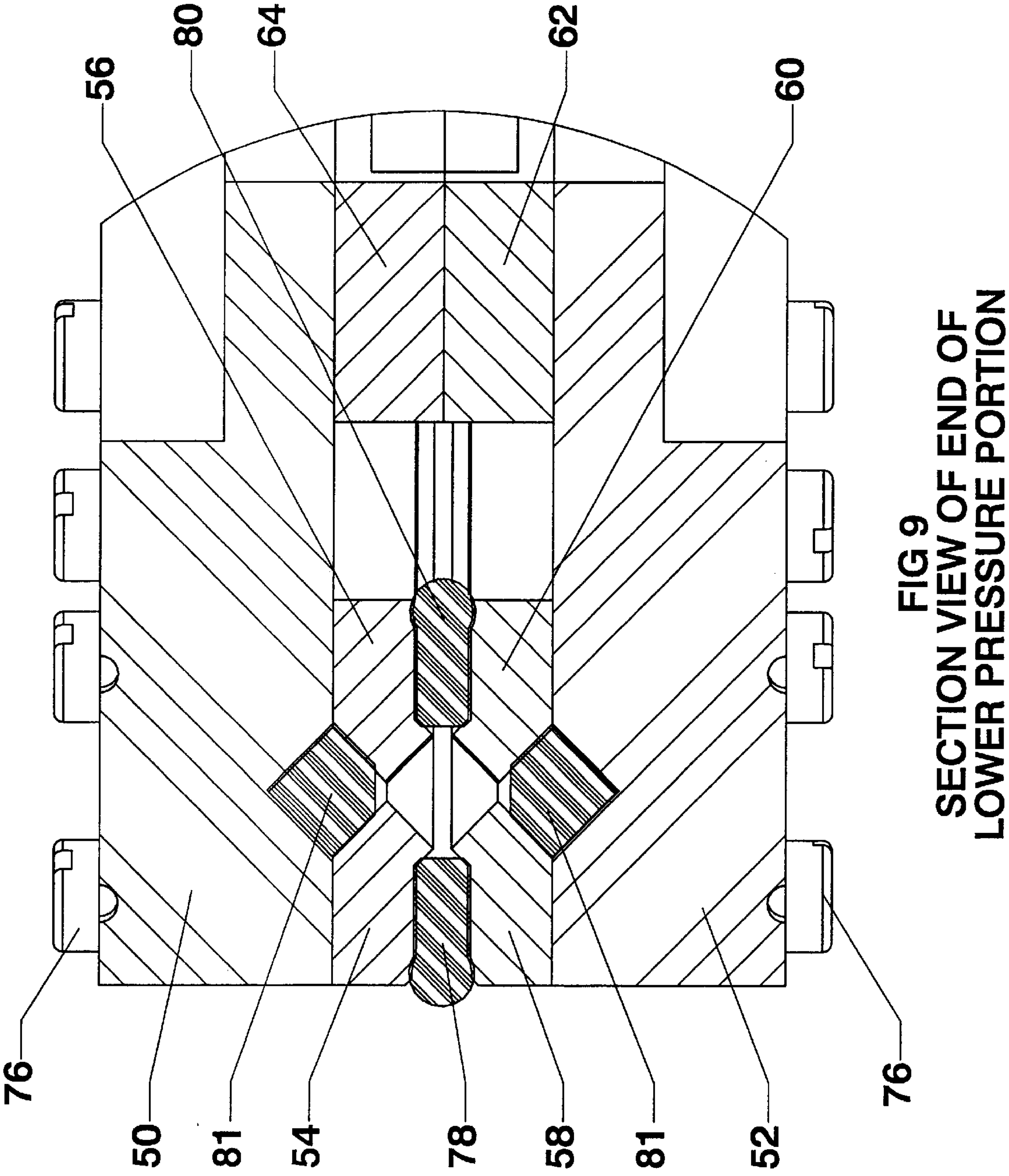
FIG. 9 is a section view across an end lower pressure portion of the collision cell of FIG. 5.

Collision cell 16 is shown in more detail in the perspective view of FIG. 5, the exploded view of the cell in FIG. 6, the exploded view of the lower half assembly in FIG. 7, and the section views of FIGS. 8 and 9. Like elements have the same reference numerals in FIGS. 5–9.

In the perspective view of FIG. 5, the collision cell includes an upper support plate 50 and a lower support plate 52 of polycarbonate for example. An upper outer pole 54 and an upper inner pole 56 are affixed to the upper plate 50 by means of mounting screws 76, and a lower outer pole 58 and a lower inner pole 60 are mounted to the lower plate 52 by mounting screws. The pole pieces are preferably gold plated aluminum. A lower spacer ring 62 and a upper spacer ring 64 separate the upper plate 50 and lower plate 52 and the pole elements mounted thereto. Opposing upper and lower pole pieces are interconnected by an electrical connector (not shown). A pair of evacuation holes 66 are provided at one end of the collision cell and evacuation holes 68 are provided at the other end of the cell. Evacuation gaps 70 are provided on the spacer rings. A pressure gauge outlet is provided at 72 and a gas inlet is provided at 74. As best seen in the cross sections of FIGS. 8 and 9 and the perspective view of FIG. 6, an outer silicone gasket 78, an inner silicone gasket 80, and upper and lower silicone end seals 81 provide a sealant for the space between the pole pieces in an intermediate portion of the pole pieces.

FIG. 7 is a perspective exploded view of the lower half assembly of the collision cell, the upper half assembly is a mirror image of the lower half. In this embodiment a 180 degree round quadrapole is used to contain the ions. RF and DC offset voltages are applied to adjacent poles. The pole profile in this embodiment is square as illustrated in the cross section views of FIGS. 8 and 9. The lower and upper plates each hold an inner and outer pole as well as a spacer ring. The two sealing silicone gaskets 78, 80 and end seals 81 are used to seal the collision region of the device. Holes and gaps on the spacer ring allow for efficient evacuation on both ends of the collision cell. The gap between the poles is optimized to withstand the RF voltage, and the length of the cell is chosen to leave enough pre and post sections so that gas can be pumped out through the gap in these sections.

FIG. 10A is a layout of the collision cell with FIG. 10B showing pressure in various zones of the cell between mass filters 1 and 2 including pre-collision low pressure zone 3, gas sealant 5, high pressure collision zone 7 with gas inlet 6, gas sealant 5, and post-collision low pressure zone 4.

FIG. 10B is a graph illustrating pressure versus collision cell length with the higher pressure in the intermediate portion of the cell, typically 1 to $15\times10^{-3}$ Torr and with the evacuated end portions having a typical gas pressure of less than $5\times10^{-6}$ Torr. To gain more analytical information on ions, an ion beam is passed through the higher pressure zone and if the speed of the ion is sufficient and the weight of the collision gas is large enough the ion will either fragment or react with the higher pressure gas. To contain the ion during the process, the multiple RF fields are used to focus the ions. This type of cell is used in mass spectrometers. The gas pressure profile allows pre and post mass filters to work most efficiently.

The ion collision cell as described combines the functions of pre and post filtering along with ion collision for fragmentation or reactions. A round configuration allows a longer cell in a smaller space and results in lower operational pressures and elimination of non-charged particles. The square cross-section permits multi-pole fields with the corner gaps optimized to accommodate pressure drop. The pole piece, spacer, and support plate configuration allow lower production cost. The necessity for a small aperture before and after the collision cell is obviate since an open gap is used at either end of the cell. The pre and post evacuation sections allow full RF focusing of ions with a high pressure region therebetween. The selected length of these regions allows the cell to operate at 100–1000 times higher pressure than the prior art filtering quadrapoles.

The continuous rod design reduces mechanical cost and simplifies the electronic design. The collision cell is lens-free thus reducing ion node effects. Further, with a longer collision cell, lower pressure operation is permitted by increasing pumping speed. The small high pressure volume reduces the time for filling and emptying the cell. A 180° implementation permits neutral particles to exit the cell while traveling in a straight line since they will not be focused by the RF fields.

The square quadrapole cross section allows a field free region in the center of the dipoles, further reducing ion node effects and allowing for a broad stable mass range for a given RF amplitude. An appropriate gap can be selected between adjacent rods to optimize the evacuation sections and still maintain ion stability. Also, by adding a DC voltage to all four rods, the parent ion entrance velocity can be easily adjusted over a wide range of energies.

While the invention has been described with reference to a specific embodiment, the description is illustrative of the invention and is not to be considered as limiting the invention. For example, while gold plated aluminum is a preferred material, other materials can be used such as a composite silicon carbide loaded aluminum alloy. While a 180° round quadrapole is described, other configurations such as linear or 90° can be employed. The square cross sectional configuration of the pole pieces is preferred but other configurations can be employed within the context of the invention. Thus, other modifications and applications may occur to those skilled in the art without departing from the true spirit and scope of the invention as defined by the appended claims.

What is claimed is:

1. An ion collision cell comprising:

an integral quadrature rod assembly including a high pressure region between a lower pressure pre-evacuation section and a lower pressure post-evacuation section, the quadrature rod assembly comprising first, second, third, and fourth pole segments, and a sealant disposed within the high pressure region with a selected gap formed between adjacent pole segments for providing controlled gas evacuation from the pre- and post-evacuation sections while maintaining ion stability within the high pressure region and pre- and post-evacuation sections.

2. The ion collision cell as defined by claim 1 and further including a gas inlet in the high pressure region for introducing a gas into the assembled pole segments.

3. The ion collision cell as defined by claim 2 wherein the pole segments are curved.

4. The ion collision cell as defined by claim 1 wherein the quadrature rod assembly is curved.

5. An ion collision cell comprising:

first and second pole segments mounted on a first support plate, said pole segments having pole surfaces arranged at approximately 90° with respect to each other, third and fourth pole segments mounted on a second support plate, said pole segments having pole surfaces arranged at approximately 90° with respect to each other, the first support plate and the second support plate being assembled together with a spacer for placing the first, second, third, and fourth pole segments in juxtaposition with the pole surfaces arranged in a generally square cross section, and a sealant for vacuum sealing an intermediate section of the assembled pole segments with a gap between adjacent pole segments, wherein gas is evacuated from a pre- and a post-intermediate sections of the assembled pole segments while maintaining ion stability along the pre-intermediate, intermediate and post-intermediate sections of the assembled pole segments.

6. The ion collision cell as defined by claim 5 and further including a gas inlet in the intermediate length for introducing a gas into the assembled pole segments, and evacuation ports at opposing ends of the assembled pole segments.

7. The ion collision cell as defined by claim 6 wherein the assembled pole segments are linear.

8. The ion collision cell as defined by claim 6 wherein the assembled pole segments are curved.

9. The ion collision cell as defined by claim 8 wherein the assembled pole segments are curved at 90°.

10. The ion collision cell as defined by claim 8 wherein the assembled pole segments are curved at 180°.

11. The ion collision cell as defined by claim 6 wherein the sealant comprises silicone gaskets between the first and third pole segments and between the second and fourth pole segments.

12. The ion collision cell as defined by claim 6 wherein the support plates comprise polycarbonate material.

13. The ion collision cell as defined by claim 6 wherein the pole segments comprise aluminum.

14. The ion collision cell as defined by claim 13 wherein the aluminum is gold plated.

15. A mass spectrometer comprising:

an ion source, an ion detector, at least one ion filter and one collision cell serially arranged between the ion source and the ion detector, the ion collision cell comprising:

first and second pole segments mounted on a first support plate, said pole segments having pole surfaces arranged at approximately 90° with respect to each other, third and fourth pole segments mounted on a second support plate, said pole segments having pole surfaces arranged at approximately 90° with respect to each other, the first support plate and the second support plate being assembled together, with a spacer for placing the first, second, third, and fourth pole segments in juxtaposition with the pole surfaces arranged in a generally square cross section, and a sealant for vacuum sealing an intermediate length of the assembled pole segments with a gap between adjacent pole segments, wherein gas is evacuated from a pre-sealant and a post-sealant sections of the assembled pole segments while maintaining ion stability along a full length of the assembled pole segments.

16. The mass spectrometer as defined by claim 15 wherein the ion collision cell further includes a gas inlet in the intermediate length for introducing a gas into the assembled pole segments, and evacuation ports at opposing ends of the assembled pole segments.

17. The mass spectrometer as defined by claim 16 wherein the assembled pole segments are linear.

18. An ion collision cell as defined by claim 16 wherein the assembled pole segments are curved.

19. An ion collision cell as defined by claim 18 wherein the assembled pole segments are curved at 90°.

20. An ion collision cell as defined by claim 18 wherein the assembled pole segments are curved at 180°.

21. An ion collision cell as defined by claim 16 wherein the sealant comprises silicone gaskets between the first and third pole segments and between the second and fourth pole segments.

22. An ion collision as defined by claim 16 wherein the support plates comprise polycarbonate material.

23. An ion collision as defined by claims-wherein the support plates comprise polycarbonate material.

24. An ion collision as defined by claim 23 wherein the aluminum is gold plated.

25. A mass spectrometer comprising:

an ion source, an ion detector, at least one ion filter and one collision cell serially arranged between the ion source and the ion detector, the ion collision cell comprising: a continuous quadrature rod assembly including a high pressure region between a lower pressure pre-evacuation section and a lower pressure post-evacuation section, said quadrature rod assembly comprising first, second, third, and fourth pole, segments, and a sealant disposed within said high pressure region with a selected gap formed between adjacent pole segments for providing controlled gas evacuation from said pre- and post-evacuation sections while maintaining ion stability within said high pressure region and pre- and post-evacuation sections.

26. The mass spectrometer as defined by claim 25 and further including a gas inlet in the high pressure region for introducing a gas into the assembled pole segments.

27. The mass spectrometer as defined by claim, 26 wherein the pole segments are curved.

28. The mass spectrometer as defined by claim 25 wherein the quadrature rod assembly is curved.

* * * * *